United States Patent
Shaw et al.

(10) Patent No.: US 10,555,152 B2
(45) Date of Patent: Feb. 4, 2020

(54) DRONE-TO-DRONE INFORMATION EXCHANGE

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 100 days.

(21) Appl. No.: 15/718,717

(22) Filed: Sep. 28, 2017

(65) Prior Publication Data

US 2019/0098433 A1 Mar. 28, 2019

(51) Int. Cl.
*H04W 4/00* (2018.01)
*H04W 4/70* (2018.01)
*G05D 1/00* (2006.01)
*G06Q 20/38* (2012.01)

(52) U.S. Cl.
CPC ............ *H04W 4/70* (2018.02); *G05D 1/0022* (2013.01); *G06Q 20/381* (2013.01); *G05D 1/0088* (2013.01)

(58) Field of Classification Search
CPC ....... H04W 4/70; H04W 72/04; H04W 12/06; H04W 4/12; H04W 12/10; H04W 12/03; G06Q 20/381; G06Q 10/08
USPC ........................................................ 709/217
See application file for complete search history.

(56) References Cited

U.S. PATENT DOCUMENTS

| | | |
|---|---|---|
| 9,346,547 B2 | 5/2016 | Patrick et al. |
| 9,409,646 B2 | 8/2016 | Fleck |
| 9,412,278 B1 | 8/2016 | Gong et al. |
| 9,436,181 B2 | 9/2016 | Peeters et al. |
| 9,540,102 B2 | 1/2017 | Levien et al. |
| 9,663,226 B2 | 5/2017 | Canavor et al. |
| 9,671,790 B2 | 6/2017 | Srivastava et al. |
| 2015/0179038 A1 | 6/2015 | Daniel et al. |
| 2016/0285864 A1* | 9/2016 | Canavor ............ H04L 63/0823 |
| 2017/0124789 A1* | 5/2017 | Rephlo ................ G06Q 10/083 |
| 2017/0195038 A1* | 7/2017 | Sham .................. H04B 7/18504 |

FOREIGN PATENT DOCUMENTS

CN 105763423 7/2016

* cited by examiner

*Primary Examiner* — Tu T Nguyen
(74) *Attorney, Agent, or Firm* — Haynes and Boone, LLP

(57) ABSTRACT

Systems and methods for cooperation among multiple drones include two or more drones in cooperation with each other, in which a first drone may provide data of interest, processing capabilities, or physical capabilities to a second drone requesting such data or capabilities. A method may include collecting, at the first drone, sensor data associated with a monitored object of interest, and receiving a request for sensor data from the second drone. The first drone may transmit an acceptance to the request, and reformat the sensor data by removing identifiable characteristics from the sensor data to create a result set of sensor data. The first drone may then transmit the result set of sensor data to the second drone.

19 Claims, 7 Drawing Sheets

DRONE-TO-DRONE INFORMATION EXCHANGE

FIELD OF THE DISCLOSURE

This disclosure relates generally to drones, such as unmanned aerial vehicles, and, more particularly, to intelligent information exchange between drones.

BACKGROUND

Drones, such as unmanned aerial vehicles (UAVs), are mobile platforms capable of acquiring (e.g., sensing) information, delivering goods, manipulating objects, etc., in many operating scenarios. Drones typically have the ability to travel to remote locations that are inaccessible to manned vehicles, locations that are dangerous to humans, or any other location. Upon reaching such locations, a suitably equipped drone may perform actions, such as acquiring sensor data (e.g., audio, images, video and/or other sensor data) at a target location, delivering goods (e.g., packages, medical supplies, food supplies, engineering materials, etc.) to the target location, manipulating objects (e.g., such as retrieving objects, operating equipment, repairing equipment etc.) at the target location, etc.

Drones are often controlled by a remote user from a command center (e.g., using a remote control, computer device, smart phone, and/or other remote monitor) such that the remote user provides commands to the drone through a wireless communications link to perform actions. More advanced drones are also being developed that are more autonomous (e.g., fully autonomous, semi-autonomous) such that drone guidance systems may assist the remote user or remove the need for the remote user altogether. These fully autonomous drones may be configured to follow an individual or group of individuals or monitor a building, facility, or other location. However, the capabilities of a drone, whether computational or physical capabilities, may be limited. As drones become more ubiquitous, opportunities for cooperation between drones may arise.

SUMMARY

An information exchange method and system conducted between two or more drones in cooperation with each other may assist a first drone in providing data of interest to one or more second drones, which can in turn utilize that data of interest for navigation to a target location and performance of tasks at the target location or for any other purpose. In some embodiments, the data of interest includes health data for a plurality of users. A method may include collecting, at a first drone, sensor data associated with a monitored object of interest, and receiving a request for sensor data from a second drone. The method may further include transmitting an acceptance to the request for sensor data, and reformatting the sensor data including removing identifiable characteristics from the sensor data to create a result set of sensor data. Further, the first drone may transmit the result set of data to the second drone.

In various embodiments of the methods and systems disclosed herein, the first drone may autonomously navigate to a location identified by the second drone, responsive to the request for sensor data.

In various embodiments of the methods and systems disclosed herein, the request for sensor data from the second drone includes an identification of one or more topics of interest corresponding to the requested sensor data, and the first drone transmits a result set of sensor data corresponding to the one or more topics of interest.

In various embodiments of the methods and systems disclosed herein, the request for sensor data from the second drone is received as part of a broadcast to a plurality of drones.

In various embodiments of the methods and systems disclosed herein, the request for sensor data further includes a request to perform a processing task on the sensor data associated with the monitored object of interest.

In various embodiments of the methods and systems disclosed herein, the acceptance to the request for sensor data further comprises a desired currency amount, and a notification of a credit to an account associated with the first drone is received.

Figure 1:
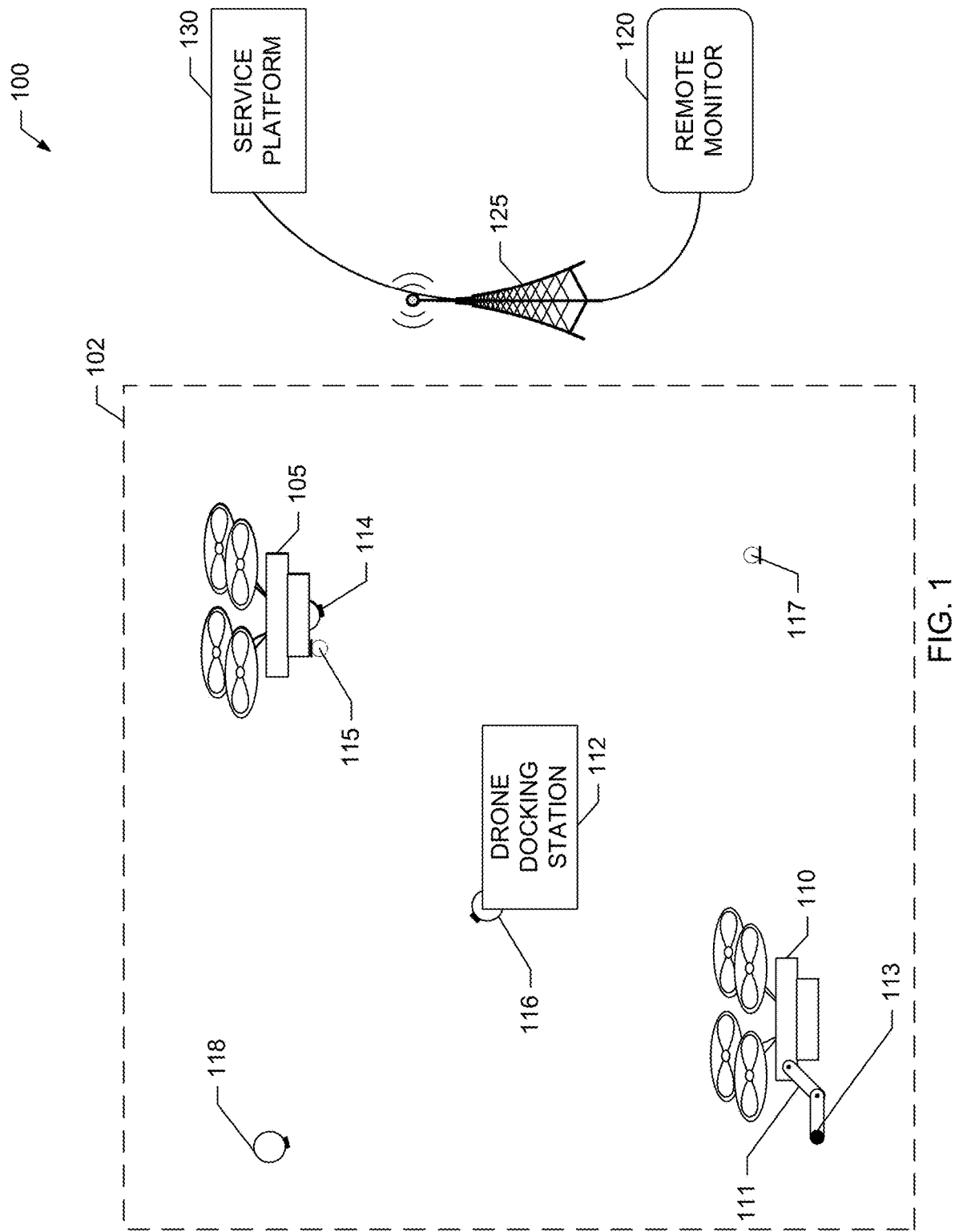
FIG. 1 is a schematic view illustrating an embodiment of a drone cooperation system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods that may be used for information exchange and cooperation between a plurality of unmanned autonomous vehicles, such as drones. As discussed above, the future ubiquity of drones and other unmanned autonomous vehicles presents opportunities for these devices to cooperate with each other in an autonomous or semi-autonomous manner. A drone may store data related to associated entities, such as a person, family, group of people, facility, building, area of land (e.g., a farm), or other entities. Furthermore, a drone may have computational capabilities, storage capabilities, or physical characteristics which are determined by the nature of the drone itself. For example, due to the relatively small size of a drone, the drone may comprise a single processor with set computational capabilities, and a size-limited amount of storage capacity. Similarly, a drone may have a particular type of sensor device (image capture sensor, acoustic sensor, etc.) but lack another type of sensor device (e.g., a biometric sensor). Methods and systems described herein describe techniques for multiple drones to, in an autonomous manner, cooperate with each other to perform tasks upon request of a particular drone. Some embodiments described herein provide techniques for drones to be compensated for cooperation with each other. Additional embodiments provide techniques for notification and discovery of needs for drones.

Referring now to FIG. 1, an embodiment of a drone cooperation system 100 is illustrated. In the illustrated embodiment, the drone cooperation system 100 includes a first drone 105 and a second drone 110 operating in a space 102. The space 102 may be any indoor and/or outdoor or outside space that may be contiguous or non-contiguous. The space 102 may be defined by geofencing techniques that may include specific geographic coordinates such as latitude, longitude, and/or altitude, and/or operate within a range defined by a wireless communication signal. The drones 105 and 110 may monitor objects, such as facilities, buildings, human beings, or other observed subjects, within the space 102.

The first drone 105 and second drone 110 may each be implemented by any type of drone, such as an unmanned aerial vehicle (UAV). In alternative embodiments, a robot, an unmanned vehicular device (e.g., land or water), and/or other vehicular device may be employed. In the illustrated examples of the present disclosure, the drones 105 and 110 are depicted as UAVs and include a flight control unit and a payload unit. For example, the flight control unit of the drones 105 and 110 includes any appropriate avionics, control actuators, and/or other equipment to fly the drone. The payload unit of the drones 105 and 110 includes any equipment implementing features supported by the given drone. For example, the payload unit of the drone 105 may include one or more sensors, such as one or more cameras and/or other imaging sensors 114, one or more environmental sensors (e.g., such as one or more temperature sensors, pressure sensors, humidity sensors, gas sensors, altitude sensors, location sensors and the like) and/or any other sensor. In the illustrated embodiment, the drone 105 may include an acoustic sensor 115 (e.g., a microphone, a microphone array, a directionally-discriminating acoustic sensor/transducer, and other acoustic sensors for detecting acoustic energy). Correspondingly, an example payload unit for the drone 110 may include tools, actuators, manipulators, etc., capable of manipulating (e.g., touching, grasping, delivering, measuring, etc.) objects. For example, as illustrated in FIG. 1, the drone 110 may include a robotic arm 111 that is configured to deploy the one or more sensors include on the robotic arm 111. For example, the one or more sensors included on the robotic arm 111 may include one or more sensors discussed above and/or a biometric sensor 113. The biometric sensor 113 may include an ocular sensor (e.g., a retinal scanner, an iris scanner, and/or other ocular sensor), a fingerprint sensor, a blood type sensor, a DNA sensor, a temperature sensor, a blood pressure sensor, a heartbeat sensor, and/or other biometric sensors. Additionally or alternatively, an example payload unit for the drone 105 or 110 may include a portable base station, signal booster, signal repeater, etc., to provide network coverage to an area.

The drone cooperation system 100 may optionally include or be used in connection with a drone docking station 112 for drone launching, landing, and/or storing the drones 105 and 110. In some embodiments, multiple drone docking stations 112 may be utilized. The drone docking station 112 may be located anywhere in the space 102 such as a rooftop, a yard, a vehicle, a room, or elsewhere. The drone docking station 112 may be connected to an external power grid and/or receive power from a local power source such as wind, solar, and/or thermal and store this power in one or more power supplies such as batteries. In certain embodiments, a battery of each drone 105 and 110 may be charged by the drone docking station 112 through a conduction pad and/or through an inductive charging device using the power of the drone docking station 112. The drone docking station 112 may include one or more sensors 116 such as one or more cameras and/or other imaging sensors, acoustic sensors, biometric sensors, one or more environmental sensors described above, and/or other sensors. Furthermore, the drone docking station 112 may include an autonomous docking guidance system for guiding the drones 105/110 to dock with the drone docking station 112. For example, the drone docking station 112 may include at least one visual indicator (e.g., lights, reflectors) and/or acoustic indicators that are recognizable by the drones 105 and 110 to assist the drone in docking with the drone docking station 112.

The first drone 105, second drone 110, and the drone docking station 112 may include communication units having one or more transceivers to enable the drones 105/110 to communicate with the drone docking station 112, one or more sensors 117 and 118 located in the space 102, a remote monitor 120, a service platform 130, and/or to communicate among other drones. Accordingly, and as disclosed in further detail below, the remote monitor 120 may be in communication with the drones 105, 110 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the drones 105, 110 and/or the drone docking station 112 in the drone cooperation system 100 of FIG. 1 include first (e.g., long-range) transceiver(s) to permit the drones 105, 110 and/or the drone docking station 112 to communicate with a communication network 125. The communication network 125 may be implemented by an example mobile cellular network, such as a long term evolution (LTE) network or other third generation (3G), fourth generation (4G) wireless network, or fifth-generation (5G) wireless network. However, in some examples, the communication network 125 may be additionally or alternatively be implemented by one or more other communication networks, such as, but not limited to, a satellite communication network, a microwave radio network, and/or other communication networks. In other examples, the drone docking station 112 may maintain a network connection through a wired (e.g., Ethernet) connection.

The drones 105, 110 and the drone docking station 112 additionally or alternatively may include second (e.g., short-range) transceiver(s) to permit the drones 105, 110 and/or the drone docking station 112 to communicate with each other, the sensors 117 and 118, other drones and/or other drone docking stations. In the illustrated example of FIG. 1, such second transceivers are implemented by a type of transceiver supporting short-range wireless networking. For example, such second transceivers may be implemented by Wi-Fi transceivers, Bluetooth® transceivers, infrared (IR) transceiver, and other transceivers that are configured to allow the drones 105, 110 and/or the drone docking station 112 to intercommunicate via an ad-hoc or other wireless network.

The drone cooperation system 100 also includes or may be used in connection with a remote monitor 120. The remote monitor 120 may be provided by a desktop computing system, a laptop/notebook computing system, a tablet computing system, a mobile phone, a set-top box, a remote control, a wearable device, and implantable device, and/or other remote monitor for controlling drones. The remote monitor 120 may be responsible for managing the drones 105, 110 deployed in the space 102. For example, the remote monitor 120 may communicate directly through the communication network 125 and/or indirectly through the drone docking station 112 to locate the drones 105, 110 in the space 102, identify the drones 105, 110 in the space 102, ascertain capabilities of the drones 105, 110 in the space 102, monitor the operating status of the drones 105, 110 in the space 102, receive sensor data provided by the drones 105, 110 in the space 102, provide instructions to the drones 105, 110, and/or provide other functionality.

The drone cooperation system 100 also includes or may be in connection with a service platform 130. For example, the service platform 130 may include one or more server devices, storage systems, cloud computing systems, and/or other computing devices (e.g., desktop computing device(s), laptop/notebook computing device(s), tablet computing device(s), mobile phone(s), etc.). As discussed below, the service platform 130 may be configured to provide repositories such a user repository of user profiles and a service repository of service profiles. For example, the user repository may include a plurality of user profiles that are associated with a user of the drone and/or a service that is accessible via the drone. The service platform may also include a services engine for communicating instruction to the drones 105/110 to provide a service.

Figure 2:
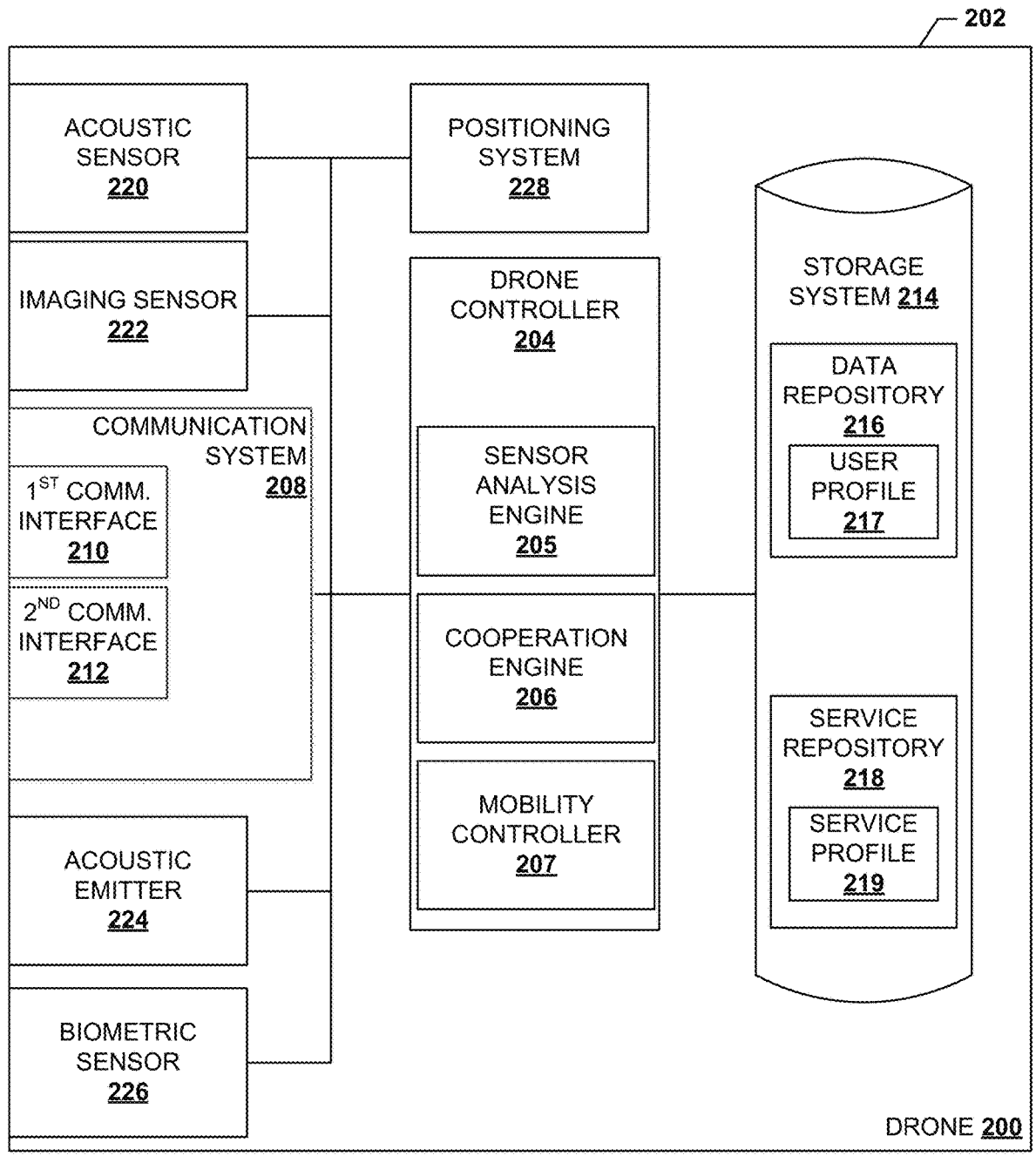
FIG. 2 is a schematic view illustrating an embodiment of a drone used in the drone cooperation system of FIG. 1.

Referring now to FIG. 2, an embodiment of a drone 200 is illustrated that may be the drone 105 or 110 discussed above with reference to FIG. 1, and which may be provided by a UAV, a robot, an unmanned vehicular device (e.g., land or water), and/or other vehicular device. In the illustrated embodiment, the drone 200 includes a chassis 202 that houses the components of the drone 200. Several of these components are illustrated in FIG. 2. For example, the chassis 202 may house a processing system (not illustrated) and a non-transitory memory system (not illustrated) that includes instructions that, when executed by the processing system, cause the processing system to provide a drone controller 204 that is configured to perform the functions of the drone controllers and/or the drones discussed below. In the specific example illustrated in FIG. 2, the drone controller 204 is configured to provide a sensor analysis engine 205 that computationally processes sensor signals with stored sensor signal profiles, and a cooperation engine 206 that performs drone-to-drone cooperation as well as the functionality discussed below. In the specific example illustrated in FIG. 2, the drone controller 204 is also configured to provide a mobility controller 207 to control the example flight control unit of drone 105/110 and to implement any control and feedback operations appropriate for interacting with avionics, control actuators, and/or other equipment included in the flight control unit to navigate the drone 105/110 illustrated in FIG. 1.

The chassis 202 may further house a communication system 208 that is coupled to the drone controller 204 (e.g., via a coupling between the communication system 208 and the processing system). The communication system 208 may include software or instructions that are stored on a computer-readable medium and that allow the drone 200 to send and receive information through the communication networks discussed above. For example, the communication system 208 may include a first communication interface 210 to provide for communications through the communication network 125 as detailed above (e.g., first (e.g., long-range) transceiver(s)). In an embodiment, the first communication interface 210 may be a wireless antenna that is configured to provide communications with IEEE 802.11 protocols (Wi-Fi), cellular communications, satellite communications, other microwave radio communications and/or communications. The communication system 208 may also include a second communication interface 212 that is configured to provide direct communication with other drones, the drone docking station 112, sensors 117 and 118, the remote monitor 120, and/other devices within the space 102 discussed above with respect to FIG. 1 (e.g., second (e.g., short-range) transceiver(s)). For example, the second communication interface 212 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may also house a storage system 214 that is coupled to the drone controller 204 through the processing system. The storage system 214 may store user profiles 217 in one or more user data repositories 216. The user profiles 217 may include information associated with a user of the drone 200, a service provided by the drone 200, or a facility associated with the drone 200. For example, a user profile 217 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone 200 to undertake various services. For example, the user information may include preselected preferences, third party data, gathered data by the drone cooperation system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), medical and health records of the user and/or any other data relevant to the user and relevant to providing services to that user. Medical or health records stored by the storage system 214 may be stored in compliance with applicable laws and regulations, e.g., the Health Insurance Portability and Accountability Act (HIPAA), and may also be encrypted as appropriate. The user information may be collected over a period of time in which the drone has been associated with the user. In some embodiments, user information may be stored for multiple users, such as a family or group of users, in data repository 216. In some embodiments, user information may be stored for a group of users as individual user profiles 217, or as a singular user profile 217. In addition, the storage system 214 may include a service repository 218 that includes a plurality of service profiles 219. The service repository 218 may include at least one application that provides instructions to the drone controller 204 when a request is received by the cooperation engine 206 of the drone. For example, the service repository 218 may provide instructions to the drone controller 204 to navigate the drone to a particular location when a request is received by the cooperation engine 206 of the drone. As another example, the service repository 218 may provide instructions to the drone controller 204 to provide data, process data, or perform a physical task (e.g., collect sensor data or move a robotic arm) when a request is received by the cooperation engine 206 of the drone.

As described above, a drone 200 may store health data (also referred to as observation data) for a plurality of users, in some embodiments, as part of a user profile 217. As an example, health data may include identity information, medical records, static characteristics of one or more users (e.g., height, blood type, family disease history), dynamic diagnostic information (e.g., blood pressure readings, glucose readings), historical analysis of static or dynamic information, prescription drug history, and the like. The health data may be stored, in one embodiment, in a relational database (e.g., a MySQL database), a non-relational database (e.g., MongoDB), or another data store. In some embodiments, the storage system 214 of drone 200 may store health data for a plurality of users. In some embodiments, the storage system 214 may contain only a subset of health data for one or more users, and also store pointers or links to a more complete dataset or to additional health data which can be retrieved, for example, over a network using communication system 208. The drone 200 may continually follow or track one or more users and collect such health or observation data based on the user's association with the drone. Further, as described above, a drone 200 may also collect observation data for a building, facility, or other object.

The chassis 202 may also house an acoustic sensor 220 (e.g., a microphone, a microphone array, a directionally-discriminating acoustic sensor, or other acoustic sensors) and an imaging sensor 222 (e.g., a two-dimensional image capturing camera, a three-dimensional image capturing camera, an infrared image capturing camera, a depth capturing camera, similar video recorders, and/or a variety of other image or data capturing devices), a biometric sensor 226 (an ocular sensor, a fingerprint sensor, a blood type sensor, a DNA sensor, a temperature sensor, a blood pressure sensor, a heartbeat sensor, and other biometric sensors) and in some embodiments, an acoustic emitter 224.

For example, the acoustic sensor 220 may include a microphone array that is configured to capture audio signals from acoustic energy in a space and provide the audio signals to the sensor analysis engine 205 to computationally process the audio signals. The acoustic sensor 220 may also be used to determine an apparent direction and/or location of the apparent source that provided the acoustic energy. Similarly, the acoustic emitter 224 may include a speaker array or other sound emitting device that generates and emits acoustic energy to the space such that the acoustic energy is reflected off objects within the space. Those objects then become apparent sources of the acoustic energy that provide unique reflected acoustic energy back to the acoustic sensor 220.

The imaging sensor 222 may be a camera and/or any other sensor device that may be used to gather visual information from a space surrounding the drone 200 for use in providing a service with the drone 200 or for use when instructed by cooperation engine 206. Imaging sensor signals may be provided to the sensor analysis engine 205 to computationally process the imaging sensor signals.

Similarly, the biometric sensors 226 other than the acoustic sensor 220 and the imaging sensor 222 may be used to gather biometric data from an individual for use in collecting data related to the individual and/or identifying and providing a service with the drone 200. Biometric sensor signals may be provided to the sensor analysis engine 205 to computationally process the biometric sensor signals.

The drone 200 may also include a positioning system 228 that is coupled to the drone controller 204. The positioning system 228 may include sensors for determining the location and position of the drone in a space. For example the positioning system 228 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

Figure 3:
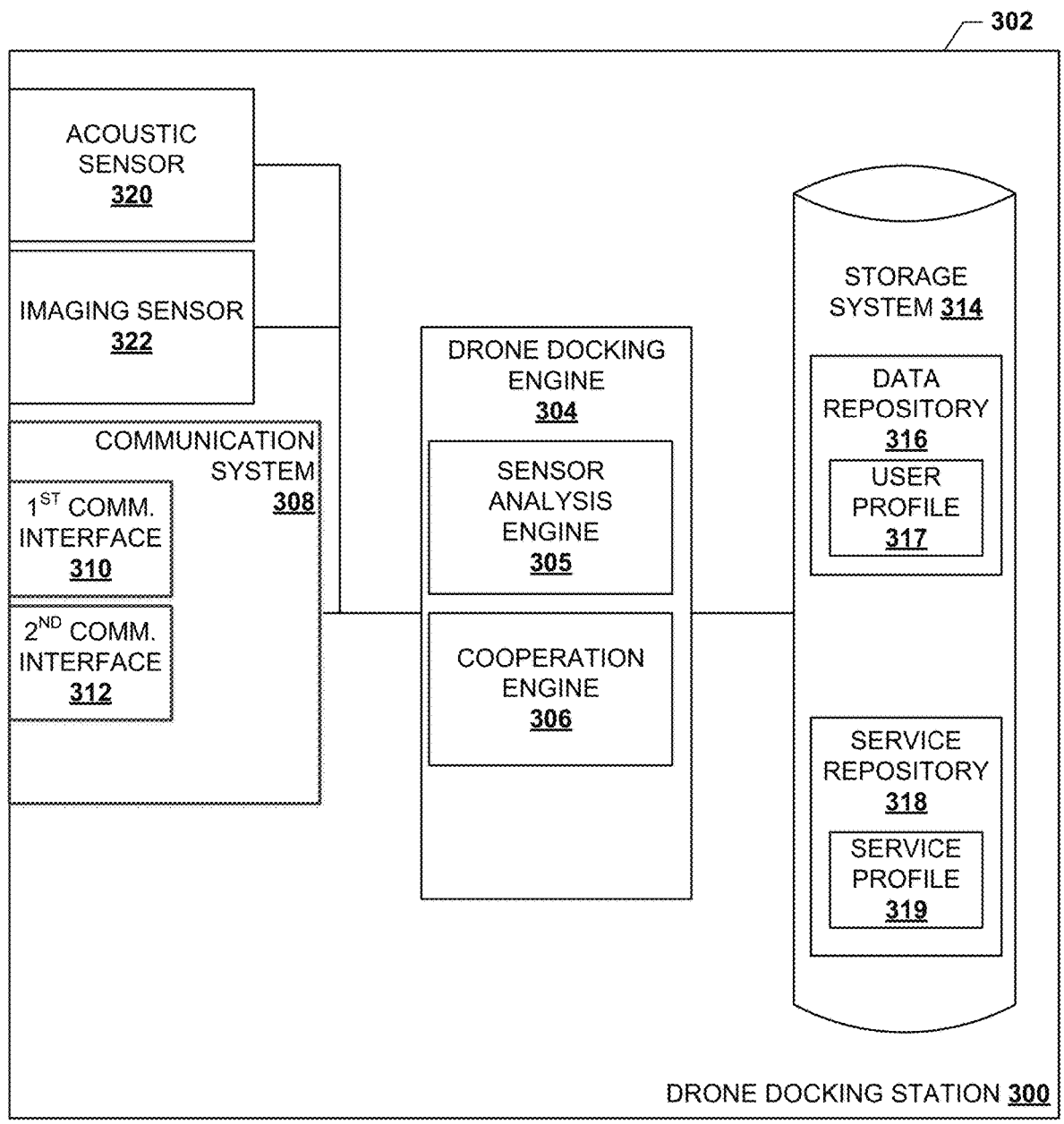
FIG. 3 is a schematic view illustrating an embodiment of a drone docking station used in the drone cooperation system of FIG. 1.

Referring now to FIG. 3, an embodiment of a drone docking station 300 is illustrated that may be the drone docking station 112 discussed above with reference to FIG. 1. In the illustrated embodiment, the drone docking station 300 includes a chassis 302 that houses the components of the drone docking station 300. Several of these components are illustrated in FIG. 3. For example, the chassis 302 may house a processing system (not illustrated) and a non-transitory memory system (not illustrated) that includes instructions that, when executed by the processing system, cause the processing system to provide a drone docking engine 304 that is configured to perform the functions of the drone docking engines and/or the drone docking stations discussed below. In the specific example illustrated in FIG. 3, the drone docking engine 304 is configured to provide a sensor analysis engine 305 that computationally processes sensor signals against stored sensor signal profiles, and a cooperation engine 306 that performs the functionality discussed below.

The chassis 302 may further house a communication system 308 that is coupled to the drone docking engine 304 (e.g., via a coupling between the communication system 308 and the processing system). The communication system 308 may include software or instructions that are stored on a computer-readable medium and that allow the drone docking station 300 to send and receive information through the communication networks discussed above. For example, the communication system 308 may include a first communication interface 310 to provide for communications through the communication network 125 as detailed above (e.g., first (e.g., long-range) transceiver(s)). In a specific example, the first communication interface 310 may be a wireless antenna that is configured to provide communications with IEEE 802.11 protocols (Wi-Fi), cellular communications, satellite communications, other microwave radio communications and/or communications. In other examples, the first communication interface 310 may provide wired communications (e.g., Ethernet protocol) from the drone docking station 300 through the communication network 125. The communication system 308 may also include a second communication interface 312 that is configured to provide direct communication with the drone 105, other drone docking stations, sensors (e.g., sensors 117 and 118), monitors, and/or other devices within the space 102 discussed above with reference to FIG. 1 (e.g., second (e.g., short-range) transceiver(s)). For example, the second communication interface 312 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 302 may also house a storage system 314 that is coupled to the drone docking engine 304 through the processing system and that is configured to store the rules and/or other data utilized by the drone docking engine 304 to provide the functionality discussed below. The storage system 314 may store user profiles 317 in one or more data repositories 316. The user profiles 317 may include information associated with a user of the drone cooperation system 100 and/or a service provided by the drone 200. For example, a user profile 317 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone cooperation system 100 to undertake various services. For example, the user information may include preselected preferences, third party data, gathered data by the drone cooperation system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), medical and health records of the user and/or any other data relevant to the user and relevant to providing services to that user. The user information may be collected over a period of time in which the drone has been associated with the user. In some embodiments, user information may be stored for multiple users, such as a family or group of users, in data repository 316. In some embodiments, user information may be stored for a group of users as individual user profiles 317, or as a singular user profile 317. In some embodiments, the data stored in user profiles 317 may be a replica copy of data stored by one or more drones 105/110/200. In addition, the storage system 314 may include a service repository 318 that includes a plurality of service profiles 319. The service repository 318 may include at least one application that provides instructions to the drone controller 204 and/or drone docking engine 304 when a request is received by the cooperation engine 306. For example, the service repository 318 may provide instructions to the drone controller 204 to navigate the drone to a particular location when a request is received by the cooperation engine 306 of the drone. As another example, the service repository 318 may provide instructions to the drone controller 204 to provide data when a request is received by the cooperation engine 306 of the drone.

The chassis 302 may also house an acoustic sensor 320 (e.g., a microphone, a microphone array, a directionally-discriminating acoustic sensor, and other acoustic sensors), an imaging sensor 322 (e.g., a two-dimensional image capturing camera, a three-dimensional image capturing camera, an infrared image capturing camera, a depth capturing camera, similar video recorders, and/or a variety of other image or data capturing devices), and in some embodiments, an acoustic emitter and a biometric sensor (not illustrated).

For example, the acoustic sensor 320 may include a microphone array that is configured to capture audio signals from acoustic energy in a space and provide the audio signals to the sensor analysis engine 305 and/or cooperation engine 306 to computationally process the audio signals. The acoustic sensor 320 may also be used to determine an apparent direction and/or location of the apparent source that provided acoustic energy.

The imaging sensor 322 may be a camera and/or any other sensor device that may be used to gather visual information from a space surrounding the drone docking station 300 for use in providing a service with the drone docking station 300. Imaging sensor signals may be provided to the sensor analysis engine 305 to computationally process the imaging sensor signals.

Figure 4:
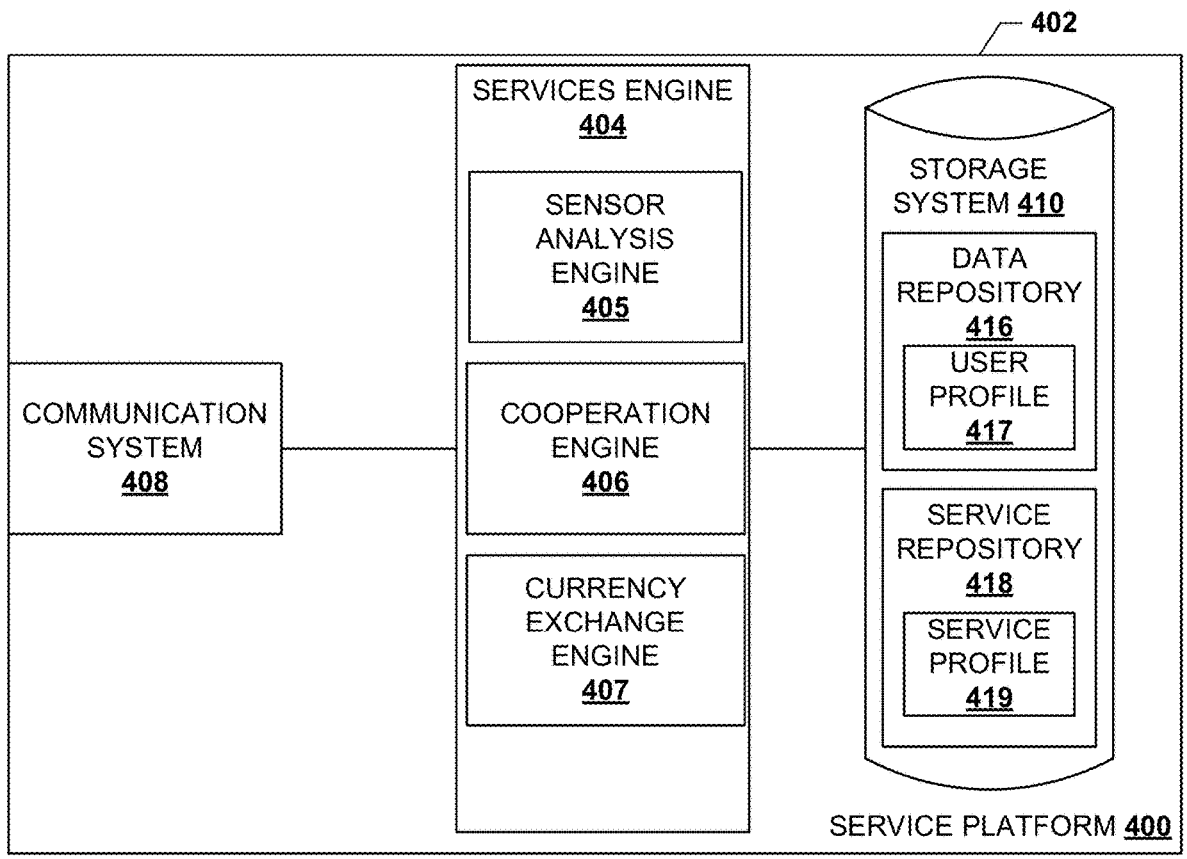
FIG. 4 is a schematic view illustrating an embodiment of a service platform used in the drone cooperation system of FIG. 1.

Referring now to FIG. 4, an embodiment of a service platform 400 is illustrated that may be the service platform 130 discussed above with reference to FIG. 1. In the illustrated embodiment, the service platform 400 includes a chassis 402 that houses the components of the service platform 400, only some of which are illustrated in FIG. 4. For example, the chassis 402 may house a processing system (not illustrated) and a non-transitory memory system (not illustrated) that includes instructions that, when executed by the processing system, cause the processing system to provide a services engine 404 that is configured to perform the functions of the services engines and/or service provider devices discussed below. In the specific example illustrated in FIG. 4, the services engine 404 is configured to provide a sensor analysis engine 405 that computationally processes sensor signals, and a cooperation engine 406 that performs the functionality discussed below.

Within services engine 404, the chassis 402 may contain a currency exchange engine 407. Currency exchange engine 407 may store, within storage system 410 (e.g., within data repository 416 or service repository 418) account information associated with a plurality of drones 200. The currency exchange engine 407 may be configured to debit or credit an account associated with a drone 200, as will be further explained below. In some embodiments, the currency exchange engine 407 may also be implemented within a drone 200 or drone docking station 300.

The chassis 402 may further house a communication system 408 that is coupled to the services engine 404 (e.g., via a coupling between the communication system 408 and the processing system) and that is configured to provide for communication through the network as detailed below. The communication system 408 may allow the service platform 400 to send and receive information over the communication network 125 of FIG. 1. The chassis 402 may also house a storage system 410 that is coupled to the services engine 404 through the processing system and that is configured to store rules and/or other data utilized by the services engine 404 to provide the functionality discussed below. The storage system 410 may store user profiles 417 in one or more data repositories 416. The user profiles 417 may include information associated with a user of the drone cooperation system 100 and/or a service provided by the drone 105/110/200 and/or service platform 400. For example, a user profile 417 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone cooperation system 100 to undertake various services. For example, the user information may include preselected preferences, third party data, gathered data by the drone cooperation system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), medical and health records of the user and/or any other data relevant to the user and relevant to providing services to that user. In some embodiments, the data stored in user profiles 417 may be a replica copy of data stored by one or more drones 105/110/200 or drone docking station 300. In addition, the storage system 410 may include a service repository 418 that includes a plurality of service profiles 419. The service repository 418 may include at least one application that provides instructions to the drone controller 204 when a request is received by the cooperation engine 206 of the drone, the cooperation engine 306 of the drone docking station 300, or cooperation engine 406. For example, the service repository 418 may provide instructions to the drone controller 204 to navigate the drone to a particular location when a request is received by the cooperation engine 206 of the drone. As another example, the service repository 418 may provide instructions to the drone controller 204 to provide data when a request is received by the cooperation engine 206 of the drone.

Figure 5:
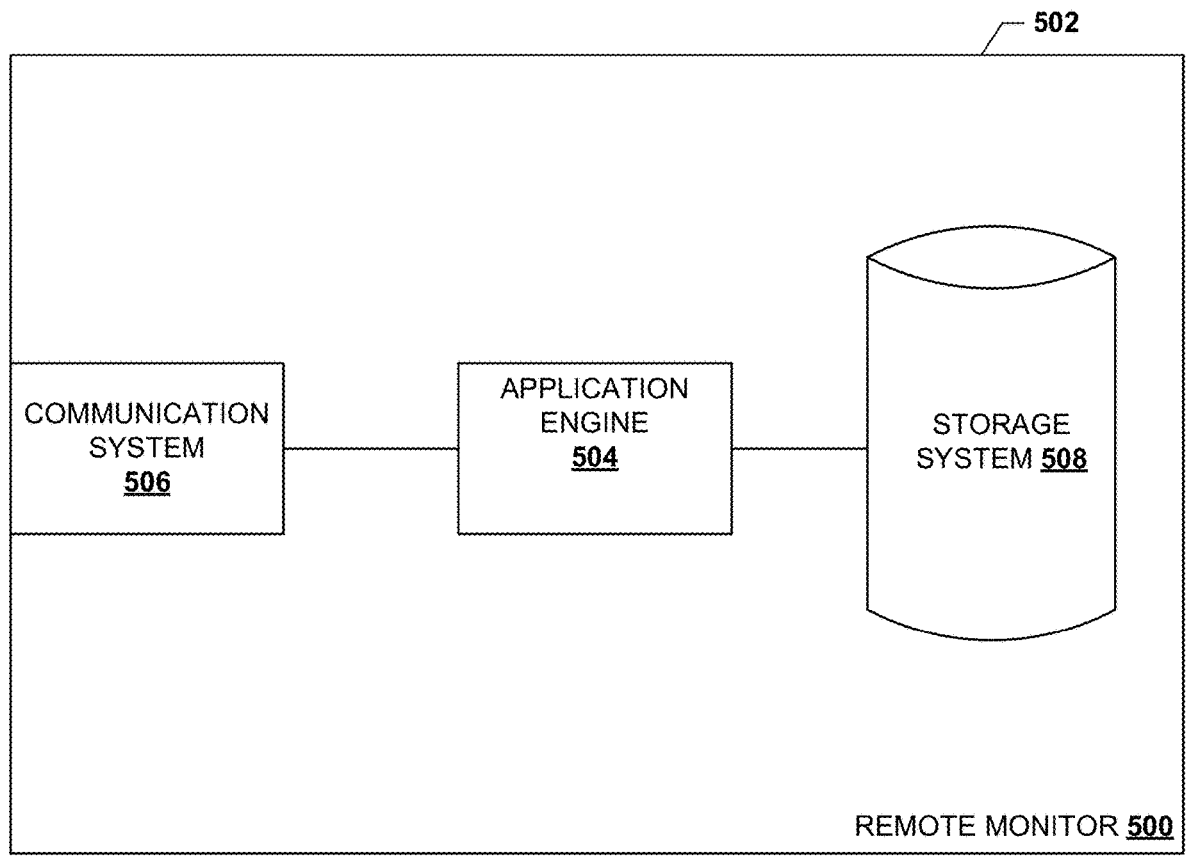
FIG. 5 is a schematic view illustrating an embodiment of a remote monitor used in the system of FIG. 1.

Referring now to FIG. 5 an embodiment of a remote monitor 500 is illustrated that may be the remote monitor 120 discussed above with reference to FIG. 1. In the illustrated embodiment, the remote monitor 500 includes a chassis 502 that houses the components of the remote monitor 500. Several of these components are illustrated in FIG. 5. For example, the chassis 502 may house a processing system (not illustrated) and a non-transitory memory system (not illustrated) that includes instructions that, when executed by the processing system, cause the processing system to provide an application engine 504 that is configured to perform the functions of the application engines, drone applications, and/or remote monitors discussed below. In the specific example illustrated in FIG. 5, the application engine 504 is configured to receive notifications from a drone and/or drone docking station that include audio feeds and video feeds, provide those notifications to an user through a drone application, receive instructions from the user through the drone application, and provide those instructions over a communication network to the drone and/or drone docking station as well as the functionality discussed below.

The chassis 502 may further house a communication system 506 that is coupled to the application engine 504 (e.g., via a coupling between the communication system 506 and the processing system) and that is configured to provide for communication through the network as detailed below. The communication system 506 may allow the remote monitor 500 to send and receive information over the communication network 125 of FIG. 1. The chassis 502 may also house a storage system 508 that is coupled to the application engine 504 through the processing system that is configured to store rules, graphics, and/or other data utilized by the application engine 504 to provide the functionality discussed below. While the storage system 508 has been illustrated as housed in the chassis 502 of the remote monitor 500, one of skill in the art will recognize that the storage system 508 may be connected to the application engine 504 through the communication network 125 via the communication system 506 without departing from the scope of the present disclosure.

Figure 6:
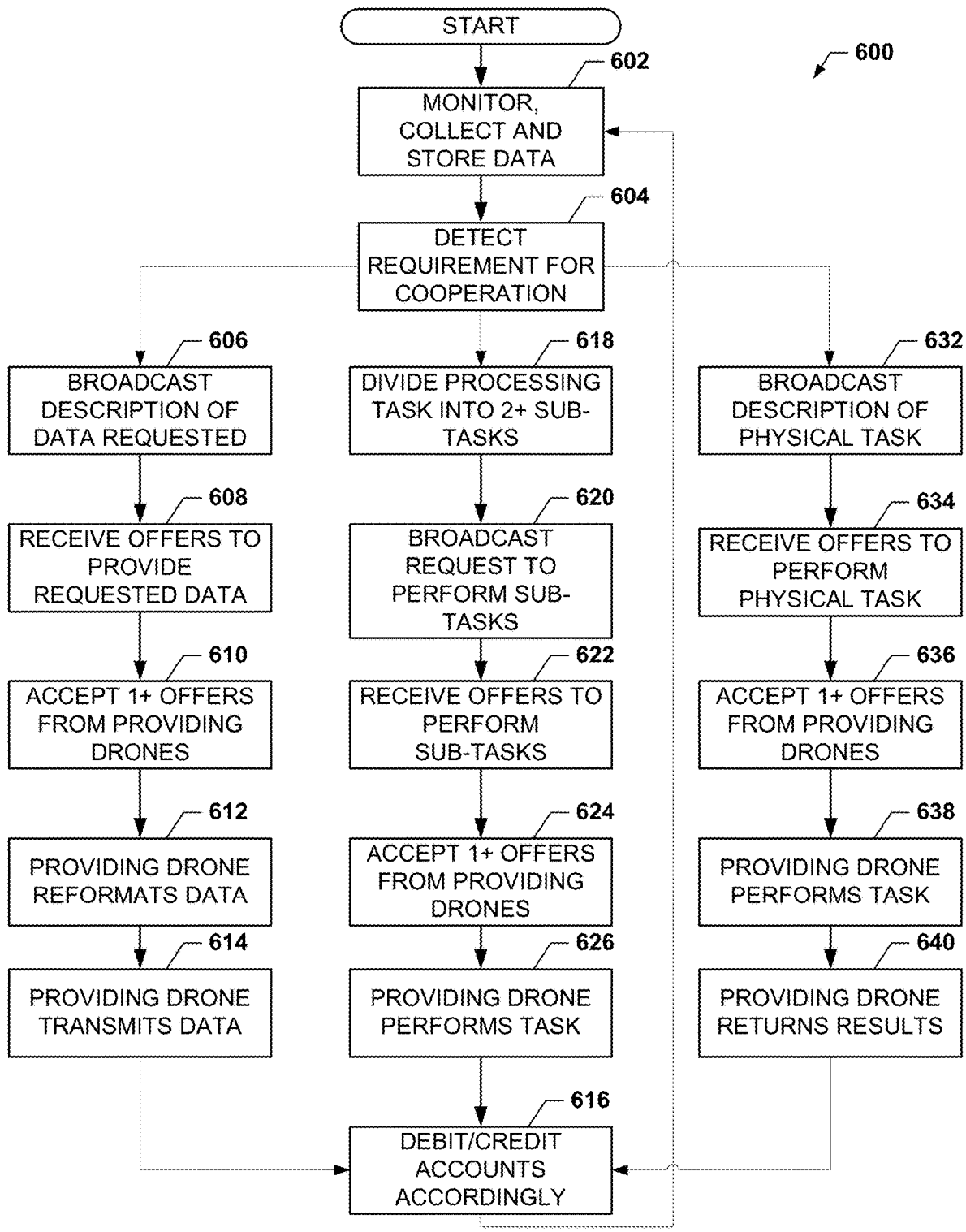
FIG. 6 is a flow chart illustrating an embodiment of a method for drone cooperation.

Referring now to FIG. 6, an embodiment of a method 600 for drone-to-drone cooperation is illustrated. The method 600 is described in terms of an example in which a first drone 105 may be referred to as a requesting drone, and a second drone 110 may be referred to as a providing drone. As discussed below, the systems and methods of the present disclosure provide a drone cooperation system that allows multiple drones to cooperate with each other to exchange data or perform tasks according to each drone's particular needs and capabilities at the time of a cooperation request or offer. Traditionally, drones operate in an isolated fashion, in which one drone has no knowledge of another drone or the capabilities and data resident on that other drone. Systems and methods of the present disclosure allow drones to detect a requirement for cooperation, and cooperate with one another to facilitate meeting those needs. Further, systems and methods of the present disclosure allow for drones to exchange currency when performing a task or providing data in response to a cooperation request. In some embodiments, responsive to the exchange of data or cooperation, a requesting drone may navigate itself to a new location to perform services at the new location. In some embodiments, a drone may learn over time opportunities for cooperation with other drones, and autonomously navigate to locations in which cooperation opportunities are expected. In some embodiments, after an initial cooperation between two drones for exchange of a data set, an updated data may be automatically exchanged when such updated data becomes available.

The method 600 begins at block 602 where a plurality of drones (including drone 105 and 110) are deployed to monitor, collect, and store data of interest. As described herein, drones may be owned by, or associated with, a facility (such as a building or power plant), an area of land (such as a produce farm), a vehicle or collection of vehicles, an animal, a human, a group of humans, or any other entity. In some embodiments, a drone may collect and store data of interest as part of a monitoring mode in which the drone is assigned to follow an entity to monitor the entity and collect relevant data describing the entity. For example, if the entity is a facility, the drone may collect data based on observation of events outside or inside the facility (e.g., using one or more sensors of the drone 105/110), receipt of data from sensors within the facility (e.g., the receipt of network traffic exiting or entering the facility), ambient conditions outside the facility (e.g., weather conditions), information from smart devices (e.g., thermostats and other Internet of Things devices), and the like. If the entity is a human being, the drone may monitor and collect medical and health data on the human, such as the person's blood type and other static characteristics, as well as dynamic characteristics such as the person's heart rate received from a smart watch or fitness tracker, and the like.

It is contemplated that a drone may serve as a mobile store of data related to its associated facility, human user, group of human users, or other observed subject. One type of data stored by the drone may be or data related to the operation of its associated facility (e.g., temperature data, electricity usage, water usage, etc.) or health data for the associated user or group of users. In that way, the associated drone may continually receive, by way of data entry on a separate computing device or observation by the drone itself, operational data for its associated facility or health data for its associated user or group of users. In addition to health data or operational data, the associated drone may perform analysis on collected data to identify trends or to diagnose potential problems. An associated drone may utilize machine learning or artificial intelligence to perform such analysis and problem identification, and likewise may also perform problem solving based on a data set to which the drone has access.

At some time, the method 600 then proceeds to block 604, where it is determined that a requirement for cooperation with one or more other drones exists. In one embodiment, the requirement for cooperation is detected by a requesting drone (e.g., first drone 105/200) itself. In one embodiment, the requirement for cooperation may be detected by a drone docking station 300 or remote monitor 400. The requirement for cooperation may be a requirement for a particular type of data, or a requirement for a particular service or function performed by another drone. The requirement for cooperation with one or more other drones may be based on an analysis performed by the drone based on updated data. For example, trends over time may be discerned as data is collected by a drone over time, and if a particular characteristic of the data is observed, a requirement for cooperation may exist. Additionally, the requirement for cooperation may be based on an external trigger; for example, a natural disaster may trigger the drone to detect a requirement for cooperation to prevent damage to a monitored building or harm to a monitored human being. Such a requirement for cooperation may be determined by a cooperation engine 206, based on a lack of data stored in data repository 216. In a further example, sensor data obtained by an acoustic sensor 220 or imaging sensor 222 and processed by sensor analysis engine 205 may result in a determination of a requirement for cooperation. In another example, the drone may need to process collected data (e.g., perform data analysis), and may determine that cooperation is needed from another drone to perform the data analysis because the drone does not have sufficient computing power to complete the analysis. In another example, cooperation engine 206 may determine that the drone needs to perform a particular service which it is currently not capable of performing due to a lack of instructions in service repository 218. In one embodiment, a requirement for cooperation may be detected by a drone based on the drone's own needs. In one embodiment, a requirement for cooperation may be detected by a drone based on a broadcast request received by the drone.

If the requirement is for a particular type of data (i.e., a data request), method 600 then proceeds to block 606. In one embodiment, at block 606, a requesting drone broadcasts (e.g., using a communication interface 210 or 212) an information item (e.g., an original data set or data item) which encodes an identification or description of data requested by the drone and potentially one or more topics associated with the data which is requested (e.g., a pull request). For example, if a requesting drone is monitoring a facility, the requesting drone may broadcast a request for weather information or power grid information to providing drone(s) in a nearby location. In some embodiments, data may be stored in a storage system 214 in a relational or non-relational database and associated with one or more topics. In some embodiments, the request broadcast from the requesting drone may include a currency amount offered in exchange for the data requested. In one embodiment, the information item follows a standardized format that each drone recognizes as a request for cooperation and processes the information item accordingly. For example, the information item may be encoded as a specific type of packet with a header or metadata identifying the information item as a request for cooperation. In some embodiments, drones may choose to process such information items at a higher priority than other received data.

As described above, the data stored by the first drone (e.g., in storage system 214) may be associated with one or more topics. For example, a subset of health data stored in user profile 217 may be tagged with a particular disease or affliction, or a characteristic, which affects one or more individuals whose health data is stored. As an example, one or more health data records may be tagged with "high blood pressure" or "low cholesterol."

In one embodiment, a requesting drone 105 may broadcast to a plurality of providing drones 110 the particular requirement of that drone. In some embodiments, the requesting drone may control how many potential providing drones receive the information item. For example, the requesting drone may transmit the item to only potential providing drones within a certain radius of itself, or alternatively, the reach may be wider (e.g., on a state level or even global level). Likewise, the requesting drone may transmit the item to only providing drones with a certain level of responsiveness based on network delay; for example, if a providing drone can receive and respond to a communication within a certain time period (e.g., five seconds), that providing drone may receive assistance requests from a particular requesting drone. In some embodiments, requesting drones may navigate themselves, using positioning system 228 and mobility controller 207, to be closer in proximity to a large number of providing drones; similarly, providing drones may navigate themselves to be closer in proximity to a requesting drone.

Method 600 then proceeds to block 608, where a requesting drone may receive notifications from other providing drone(s) containing some or all of the requested data with offers to provide the requested data (again, using communications interfaces 210/212 and cooperation engine 206). For example, a requesting drone may receive an offer for all of the requested data from a single providing drone, or may receive an offer for a subset of the requested data from a first providing drone and another offer for another subset of the requested data from a second providing drone. Additionally, at block 608, the providing drones offering the requested data to the requesting drone may negotiate the amount they are willing to accept for the requested data. For example, the requesting drone's offer for the data may be too low than providing drones are willing to accept. In such an instance, the providing drones may respond to the first drone with a different currency amount. Correspondingly, providing drones having the data requested by the requesting drone may have knowledge of other drones' ability to provide the same data. In such an instance, the currency amount offered by the requesting drone may act as a starting bid in an auction, and the providing drones may communicate and compete against one another autonomously to bid progressively lower currency amounts before one providing drone wins the auction. In one embodiment, a providing drone transmits to additional providing drones the request for data, so that the providing drone can aggregate data from additional drones to respond to the requesting drone's request.

Method 600 then proceeds to block 610, where the requesting drone accepts one or more of the offers from the providing drones. In one embodiment, accepting the offer may include transmitting a notification to the providing drone or drones whose offers have been accepted using a communications interface 210/212 of communication system 208.

Method 600 then proceeds to block 612. At block 612, responsive to a notice that an offer has been accepted, a providing drone may reformats the data to be provided to the requesting drone. In one embodiment, reformatting the data may include anonymizing the data to be provided to the requesting drone. For example, if the requesting drone's request sought health data of one or more users, a cooperation engine 206 of the providing drone may access the stored health data (e.g, stored as a user profile 217 within data repository 216), and remove any identity data from the health data. For example, names, addresses, social security numbers, and other personally-identifiable data may be used by providing drones in their monitoring of their subjects, but privacy mandates that such data is not shared with requesting drones. Thus, the providing drone removes such information from its data repository (e.g., in a copy which is temporarily stored). Similarly, if the stored data to be provided is environmental data from a providing drone which monitors a building or facility, information specific to that building or facility may be removed from a data set before it is provided to the requesting drone. In some embodiments, anonymizing or removing personally identifiable characteristics may include aggregating data characteristics so as to create an aggregated set of data by which a particular individual's data cannot be discerned.

In one embodiment, reformatting the data may include modifying the schema of the data to be provided. For example, if the requesting drone uses a first type of database (e.g., a non-relational database), but the providing drone uses a second type of database (e.g., a relational database), the providing drone may modify the data according to an application programming interface or conversion software to modify the data such that the requesting drone can interpret and utilize the data. Reformatting may be based on information within the request for data, or may be based upon a providing drone's knowledge of previous interactions with the requesting drone.

Method 600 then proceeds to block 614. At block 614, the providing drone transmits the requested, reformatted data (i.e., the result data set) to the requesting drone. Method 600 proceeds to block 616, where, if the request for the data included a currency amount offered in exchange for the data, an account associated with the providing drone may be credited with the currency amount, and an account associated with the requesting drone may be debited by the currency amount, for example, using currency exchange engine 407 of service platform 400. In some embodiments, a direct peer-to-peer (i.e., drone-to-drone) currency exchange is performed, such that no centralized currency exchange engine is needed. For example, each drone 105/110/200 may perform the operations of a currency exchange engine to debit or credit an account accordingly. Once block 616 is completed, method 600 may return to block 602, wherein the requesting drone returns to collect and store data.

If, at block 604, the requirement for cooperation indicates that a processing task of the requesting drone requires cooperation with one or more other providing drones, method 600 proceeds to block 618. For example, the requesting drone may receive, or require, a processing task to be performed. The requesting drone may determine that the computing capacity of its own processor(s) is insufficient to perform the processing task. For example, the processor of the requesting drone may not be capable of performing the processing task in a time frame in which other processes of the requesting drone require the data. Similarly, an amount of storage may be required to perform the processing task that exceeds the amount of storage resident on the requesting drone. Thus, the need determined at block 604 may be a processing need, and in turn, method 600 proceeds to block 618, where the requesting drone divides the processing task into two or more sub-tasks.

In one embodiment, at least one of the sub-tasks into which the processing task is divided is capable of being performed on the requesting drone itself. In one embodiment, the requesting drone may divide the processing task into sub-tasks which cannot be performed on the requesting drone. In one embodiment, the requesting drone divides the processing task into sub-tasks using a parallel processing algorithm (e.g., MapReduce, or the like). In one example, dividing the task into sub-tasks includes dividing a data set into one or more smaller data sets. For example, the processing task may require processing 100,000 rows in a database; division of the processing task into sub-task may result in two processing tasks of 50,000 rows each. Once the processing task is divided into two or more sub-tasks at block 618, method 600 proceeds to block 620.

At block 620, much like block 606, the requesting drone broadcasts an information item (i.e., an original data set or information item) which encodes at least one sub-task requested by the requesting drone. For example, the information item may include an identification of the requesting drone, a summary of the sub-task or the processing task, and other information, such as a location for the data to be processed. Furthermore, the information item may include a currency amount offered in exchange for performance of the sub-task. The broadcasted information may also include other information regarding the sub-task, such as a deadline for performance, a priority of the sub-task, or other further details that may assist potential providing drones in determining whether those providing drones should accept the request to perform the sub-task. Other information may be encoded in the request for assistance. For example, the drone may include detailed status information of the task, such as a percentage of completion, or how many other sub-tasks are included in the overall task. As also described above, a requesting drone may broadcast to a plurality of providing drones the particular requirement of that drone, and in some embodiments, the requesting drone may control how many potential providing drones receive the information item. For example, the requesting drone may transmit the item to only potential providing drones within a certain radius of itself, or alternatively, the reach may be wider (e.g., on a state level or even global level). Likewise, the requesting drone may transmit the item to only providing drones with a certain level of responsiveness based on network delay; for example, if a providing drone can receive and respond to a communication within a certain time period (e.g., five seconds), that providing drone may receive assistance requests from a particular requesting drone.

Method 600 then proceeds to block 622, where a requesting drone may receive notifications from other providing drone(s) with offers to perform one or more of the sub-tasks. For example, a requesting drone may receive an offer to perform the entire sub-task from a providing drone, or may receive an offer to perform a sub-sub-task of the sub-task from a first providing drone and another offer to perform another sub-sub-task from a second providing drone. In some embodiments, a providing drone may receive a sub-task, and itself divide the sub-task into multiple sub-sub-tasks and transmit requests for performance of those sub-sub-tasks, without notifying the originally requesting drone. Additionally, at block 622, the providing drones offering performance of the sub-tasks to the requesting drone may negotiate the amount they are willing to accept for performance of the sub-task. For example, the requesting drone's offer for the data may be too low than providing drones are willing to accept. In such an instance, the providing drones may respond to the first drone with a different currency amount. Correspondingly, providing drones having the capability to perform the sub-task requested by the requesting drone may have knowledge of other drones' ability to perform the same sub-task(s). In such an instance, the currency amount offered by the requesting drone may act as a starting bid in an auction, and the providing drones may communicate and compete against one another autonomously to bid progressively lower currency amounts before one providing drone wins the auction.

Method 600 then proceeds to block 624, where the requesting drone accepts one or more of the offers from the providing drones. In one embodiment, accepting the offer may include transmitting a notification to the providing drone or drones whose offers have been accepted. Further, responsive to accepting the offer, the requesting drone may transmit any information and instructions necessary to perform the sub-task to the providing drone, which also may be considered an original data set.

Method 600 then proceeds to block 626. At block 626, the providing drone may perform the sub-task and return any results to the requesting drone (e.g., as a result data set). In some embodiments, the providing drone, responsive to the receipt of a notification of a sub-task, may navigate itself to be proximate to the requesting drone, for example, to reduce the time needed to provide the requesting drone with the results of performing the sub-task. Method 600 then proceeds to block 616, where, if the request for the performance of the sub-task included a currency amount offered in exchange for the performance of the sub-task, an account associated with the providing drone may be credited with the currency amount, and an account associated with the requesting drone may be debited by the currency amount. As described above, this may be performed by a currency exchange engine 407 within a service platform 400, or autonomously by the requesting and providing drones themselves. Once block 616 is completed, method 600 may return to block 602, wherein the requesting drone returns to collect and store data.

If, at block 604, the need indicates that the requesting drone does not have the physical capability to perform a task, and requires cooperation with one or more other providing drones, method 600 proceeds to block 632. For example, with reference to FIG. 1, drone 110, which includes a robotic arm 113, may require image sensor data, but drone 110 is not itself equipped with any image sensor capabilities, or may not have an image sensor capable of obtaining a high resolution image. Drone 105 has such an image sensor 114, however. In a corresponding example, drone 105 may have recognized an object to be recovered using its image sensor 114, but requires robotic arm 113 on drone 110 to retrieve and recover the object. In one embodiment, the physical task may simply be the presence of an additional drone, for example, if a drone is equipped with a signal booster device, its presence may be used to enhance cellular network capacity within a particular area.

Thus, at block 632 of method 600, a requesting drone (e.g., drone 110 in this example) may broadcast to potential providing drones an information item encoding a request to perform a physical task. In this example, drone 110 broadcasts a request to obtain image sensor data, although the request may include any other need that a requesting drone may experience (e.g., obtaining of acoustic sensor data, retrieval of an item using a robotic arm, etc.).

Furthermore, the information item may include a currency amount offered in exchange for performance of the physical task. The broadcasted information item may also include other information regarding the physical task, such as a deadline for performance, a priority of the physical task, or other further details that may assist potential providing drones in determining whether those providing drones should accept the request to perform the physical task. Other information may be encoded in the request for assistance. For example, a location for performance of the physical task may be included in the information item, which may cause a providing drone to navigate to the location and determine whether it can perform the physical task. As also described above, a requesting drone may broadcast to a plurality of providing drones the particular need of that drone, and in some embodiments, the requesting drone may control how many potential providing drones receive the information item. For example, the requesting drone may transmit the item to only potential providing drones within a certain radius of itself, or alternatively, the reach may be wider (e.g., on a state level or even global level). Likewise, the requesting drone may transmit the item to only providing drones with a certain level of responsiveness based on network delay; for example, if a providing drone can receive and respond to a communication within a certain time period (e.g., five seconds), that providing drone may receive assistance requests from a particular requesting drone.

Method 600 then proceeds to block 634, where a requesting drone may receive notifications from other providing drone(s) with offers to perform the physical task. In some embodiments, a potential providing drone without the capability to perform the physical task may still receive a notification of a physical task, and itself re-transmit the request to perform the physical task to other providing drones. Thus, for example, a providing drone may act as a broker or a finder for performance of the physical task. Additionally, at block 634, the providing drones offering performance of the physical task to the requesting drone may negotiate the amount they are willing to accept for performance. For example, the requesting drone's offer for the data may be too low than providing drones are willing to accept. In such an instance, the providing drones may respond to the first drone with a different currency amount. Correspondingly, providing drones having the capability to perform the physical task requested by the requesting drone may have knowledge of other drones' ability to perform the same physical task. In such an instance, the currency amount offered by the requesting drone may act as a starting bid in an auction, and the providing drones may communicate and compete against one another autonomously to bid progressively lower currency amounts before one providing drone wins the auction.

Method 600 then proceeds to block 636, where the requesting drone accepts one or more of the offers from the providing drones. In one embodiment, accepting the offer may include transmitting a notification to the providing drone or drones whose offers have been accepted. Further, at block 636, responsive to accepting an offer from a providing drone, the requesting drone may transmit any information and instructions necessary to perform the physical task to the providing drone. For example, in one embodiment, the requesting drone may transmit coordinates to be used in navigating the one or more providing drones to a location for performing the physical task.

Method 600 then proceeds to block 640. At block 640, the providing drone may perform the physical task and return any results (e.g., sensor data or a notification of completion) to the requesting drone. Method 600 then proceeds to block 616, where, if the request for the performance of the physical task included a currency amount offered in exchange for the performance of the physical task, an account associated with the providing drone may be credited with the currency amount, and an account associated with the requesting drone may be debited by the currency amount. Once block 616 is completed, method 600 may return to block 602, wherein the requesting drone returns to collect and store data.

Thus, although drones are contemplated as quite powerful, such drones may become even more powerful and more helpful to its associated user or facility when the assistance of other drones is leveraged. For example, while a drone associated with a facility may store and analyze its own operational data to anticipate and prevent downtime due to power surges or temperatures outside an ideal range (as some examples), the drone may better anticipate such potential events by communicating with other drones associated with other facilities. For example, a first drone associated with a first building may exchange data with a second drone associated with a second drone to determine whether the second building is experiencing a deviation in operational data, and may better anticipate that the first building is about to experience the same deviation in operational data and adjust parameters of the first building in anticipation of the change. Thus, in some embodiments, drones may form a type of ad-hoc social network.

In some embodiments, drones may communicate their capabilities to a central repository, which may itself be a drone. That is, a plurality of drones may communicate their capabilities, or information they store, or other characteristics (e.g., physical characteristics of the drone, computing characteristics, sensors deployed on the drone) to a so-called "directory drone," which can be queried by requesting drones in need of specific data or a particular service.

In some embodiments, a drone may be configured to anticipate, based on prior trends, whether other drones may need assistance based on the occurrence of an event (whether regular or one-time). For example, if a particular drone regularly broadcasts a need for sensor data from a camera device during rush hour traffic, other drones may over time recognize that need and position themselves proximate to that drone (e.g., by causing the drone to be navigated to that location) to serve any requests for assistance from that drone.

In some embodiments, recipient drones (i.e., drones which have received the information item from the transmitting drone) may respond to offers according to the drone's own preferences, or the preferences of an operator of the drone. For example, a recipient drone may be configured to receive all offers for cooperation, but only respond to offers that are within a maximum physical distance from the drone (e.g., 10 miles, or another distance). In some embodiments, the drone may respond to offers based on a measurement of network transmission time, i.e., if the communication of the acceptance of the offer can be completed within a particular time period (e.g., one second), then the drone may respond to such an offer, but not if the time required to communicate the acceptance is over that threshold.

In some embodiments, responsive to an initial information exchange between a requesting drone and a providing drone, the requesting drone may subscribe to information updates from the providing drone. That is, the providing drone may continually update data on an observed subject, and at periodic intervals may reformat data and provide such data to a particular requesting drone, as described above. The requesting drone may subscribe to information updates on a particular topic of data from the providing drone as well.

In some embodiments, data need not be reformatted before a providing drone transmits data to the requesting drone. For example, if the providing drone and requesting drone are associated with the same observed subject, or if the requesting drone serves as a replica data store for the providing drone, reformatting may not be necessary.

In some embodiments, the currency exchanged between drones is a traditional fiat currency (e.g., U.S. dollar). In some embodiments, the currency exchanged between drones may be a digital currency or a cryptocurrency. In some embodiments, the currency exchanged between drones is an offer or promise for future performance of a task (e.g., a contract between drones).

In some embodiments, a drone may convey received information to a human, for example, using an acoustic emitter 224. In some embodiments, a drone may convey received information to a human via an application programming interface of an information website, such as a social networking website, or via an application programming interface of a computing device, such as a handheld computing device used by medical personnel. A service profile 219 within service repository 218 may store conversion information or profiles which may convert a data set into human-interpretable information, for example, using artificial intelligence techniques or machine learning techniques.

Figure 7:
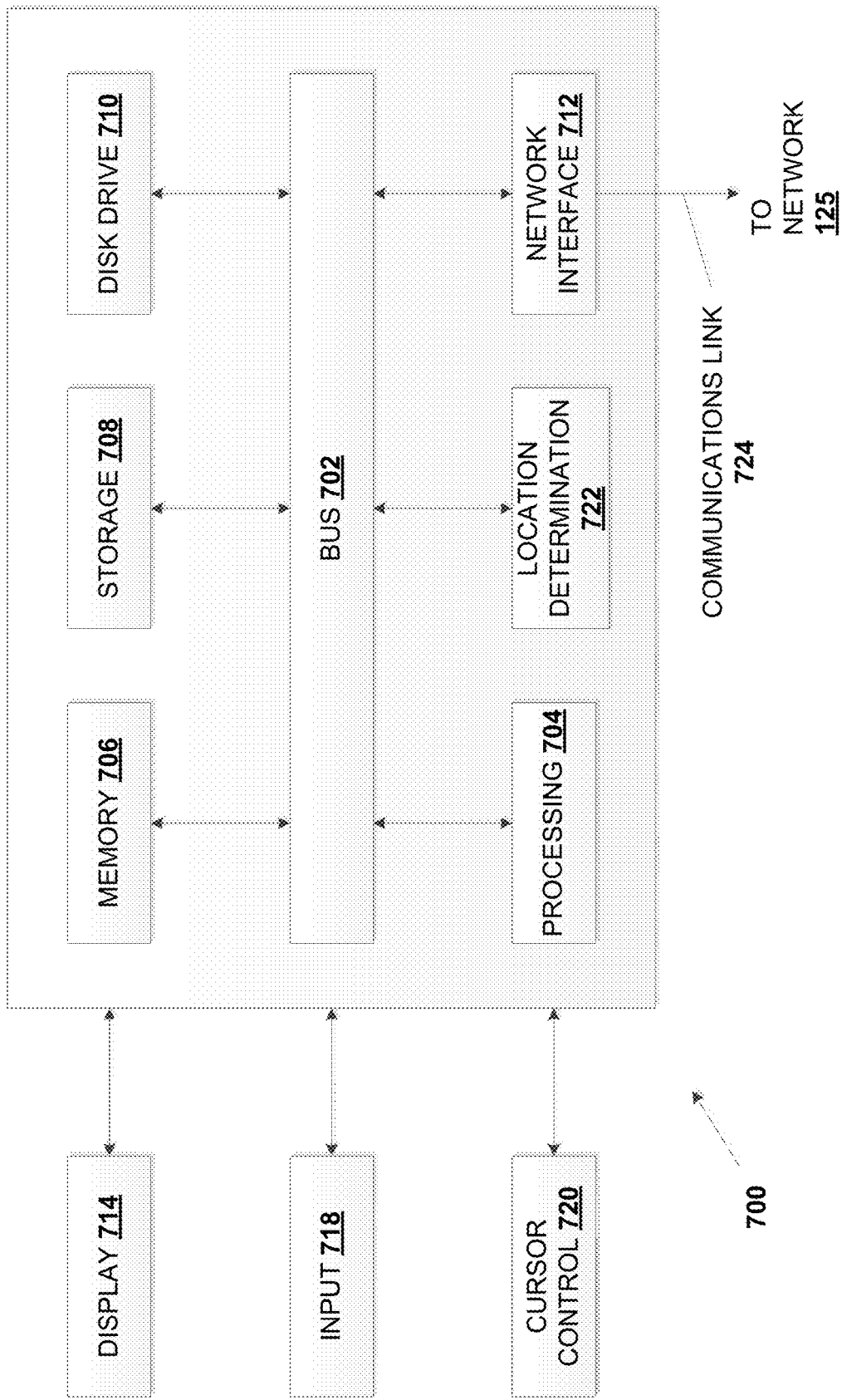
FIG. 7 is a schematic view illustrating an embodiment of a computer system.

Referring now to FIG. 7, an embodiment of a computer system 700 suitable for implementing, for example, the control of the drones 105, 110 and/or 200, the drone docking stations 112 and/or 300, the remote monitor 120, 500, and/or 800 and the service platforms 130 and/or 400, is illustrated. It should be appreciated that other devices utilized in the cooperation system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 912 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices.) In one implementation, the disk drive component 710 may comprise a database having one or more disk drive components.

In accordance with embodiments of the present disclosure, the computer system 700 performs specific operations by the processing component 704 executing one or more sequences of instructions contained in the system memory component 706, such as described herein with respect to the drone(s), the drone docking station(s), the service platform, and/or the remote monitor(s). Such instructions may be read into the system memory component 706 from another computer-readable medium, such as the static storage component 708 or the disk drive component 710. In other embodiments, hardwired circuitry may be used in place of or in combination with software instructions to implement the present disclosure.

Logic may be encoded in a computer-readable medium, which may refer to any medium that participates in providing instructions to the processing component 704 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 710, volatile media includes dynamic memory, such as the system memory component 706, and tangible media employed incident to a transmission includes coaxial cables, copper wire, and fiber optics, including wires that comprise the bus 702 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to a communication network 125 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (e.g., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. An apparatus, comprising:
a first unmanned aerial vehicle comprising a first communications interface, a first non-transitory storage, and a first processor having a first compute capacity;
a second unmanned aerial vehicle comprising a second communications interface, a second non-transitory storage, and a second processor having a second compute capacity;
a currency exchange system, comprising at least a non-transitory storage storing account information associated with each of the first and second unmanned aerial vehicles and a currency exchange system processor;
wherein the first processor is configured to execute instructions to perform operations comprising:
transmitting a processing request for assistance to the second unmanned aerial vehicle, the processing request for assistance associated with a processing task;
receiving an acceptance corresponding to the processing request for assistance from the second unmanned aerial vehicle;
dividing the processing task into a first sub-task and a second sub-task, wherein the first compute capacity is sufficient to perform the first sub-task; and
transmit an original data set to the second unmanned aerial vehicle corresponding to the second sub-task;
wherein the second processor is configured to execute instructions to perform operations comprising:
transmitting, to the first unmanned aerial vehicle and responsive to the request for assistance, the acceptance corresponding to the request for assistance; and
transmitting a result data set responsive to the original data set to the first unmanned aerial vehicle, the result data set corresponding to the performance of the second sub-task by the second unmanned aerial vehicle.

2. The apparatus of claim 1, wherein transmitting an original data set to the second unmanned aerial vehicle further comprises:
transmitting an identification of required data in a pull request; and
wherein transmitting a result data set to the first unmanned aerial vehicle comprises:
removing personally identifiable characteristics from observation data stored by the second unmanned aerial vehicle to create a reformatted subset of observation data; and
responsive to the identification of required data in the pull request, transmit the reformatted subset of observation data to the first unmanned aerial vehicle.

3. The apparatus of claim 2, wherein transmitting the identification of required data in the pull request further includes transmitting one or more topics associated with the required data.

4. The apparatus of claim 1, wherein transmitting a request for assistance to the second unmanned aerial vehicle comprises broadcasting the request for assistance to plurality of unmanned aerial vehicles including at least the second unmanned aerial vehicle.

5. The apparatus of claim 1, wherein the original data set further comprises a currency amount offered to the second unmanned aerial vehicle; and wherein the currency exchange system processor is configured to debit an account associated with the first unmanned aerial vehicle and credit an account associated with a second unmanned aerial vehicle responsive to the transmission of the result set by the second unmanned aerial vehicle.

6. A non-transitory machine-readable medium having stored thereon machine-readable instructions executable to cause a machine to perform operations comprising:
- collecting, at a first drone, sensor data associated with a monitored object of interest;
- receiving, at the first drone, a request for sensor data from a second drone,
- transmitting an acceptance to the request for sensor data;
- reformatting the sensor data associated with the monitored object of interest, wherein reformatting includes at least removing identifiable characteristics from the sensor data associated with the monitored object of interest and adjusting a schema of the sensor data, and wherein the reformatting creates a result set of sensor data; and
- transmitting, to the second drone, the result set of sensor data.

7. The non-transitory machine-readable medium of claim 6, the operations further comprising:
- autonomously navigating, by the first drone, to a location identified by the second drone responsive to the request for sensor data.

8. The non-transitory machine-readable medium of claim 6, wherein the request for sensor data from the second drone includes an identification of one or more topics of interest corresponding to the requested sensor data, and transmitting the result set of sensor data further comprises transmitting the result set of sensor data corresponding to the one or more topics of interest.

9. The non-transitory machine-readable medium of claim 6, wherein the request for sensor data from the second drone is received as part of a broadcast to a plurality of drones.

10. The non-transitory machine-readable medium of claim 6, wherein the request for sensor data further includes a request to perform a processing task on the sensor data associated with the monitored object of interest.

11. The non-transitory machine-readable medium of claim 6, wherein the acceptance to the request for sensor data further comprises a desired currency amount, and wherein the operations further comprise:
- receiving a notification of a credit to an account associated with the first drone in the amount of the desired currency amount.

12. A method of communications among a plurality of drones, the method comprising:
- collecting, at a first drone, sensor data associated with a monitored object of interest;
- receiving, at the first drone, a request for sensor data from a second drone,
- transmitting an acceptance to the request for sensor data;
- reformatting the sensor data associated with the monitored object of interest, wherein reformatting includes at least removing identifiable characteristics from the sensor data associated with the monitored object of interest and adjusting a schema of the sensor data, and wherein the reformatting creates a result set of sensor data; and
- transmitting, to the second drone, the result set of sensor data.

13. The method of claim 12, further comprising:
- autonomously navigating, by the first drone, to a location identified by the second drone responsive to the request for sensor data.

14. The method of claim 12, wherein the request for sensor data from the second drone includes an identification of one or more topics of interest corresponding to the requested sensor data, and transmitting the result set of sensor data further comprises transmitting the result set of sensor data corresponding to the one or more topics of interest.

15. The method of claim 12, wherein the request for sensor data from the second drone is received as part of a broadcast to a plurality of drones.

16. The method of claim 12, wherein the request for sensor data further includes a request to perform a processing task on the sensor data associated with the monitored object of interest.

17. The method of claim 12, wherein the acceptance to the request for sensor data further comprises a desired currency amount, and wherein the method further comprises:
- receiving a notification of a credit to an account associated with the first drone in the amount of the desired currency amount.

18. The method of claim 12, wherein the request for sensor data from the second drone further comprises an offered currency amount, and wherein the method further comprises:
- transmitting, within the acceptance to the request for sensor data, a negotiated currency amount; and
- receiving, at the first drone, an acceptance from the second drone corresponding to the negotiated currency amount.

19. The method of claim 12, further comprising:
- transmitting, to a third drone monitoring the object of interest, the request for sensor data;
- aggregating sensor data received from the third drone and collected sensor data; and
- wherein removing identifiable characteristics and transmitting are performed on the aggregated sensor data.

* * * * *